(12) United States Patent
Yun et al.

(10) Patent No.: US 11,164,439 B2
(45) Date of Patent: Nov. 2, 2021

(54) VEHICLE AND CONTROL METHOD OF THE VEHICLE

(71) Applicants: Hyundai Motor Company, Seoul (KR); Kia Motors Corporation, Seoul (KR)

(72) Inventors: Jeong-gi Yun, Seoul (KR); Jinwon Park, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 16/988,049

(22) Filed: Aug. 7, 2020

(65) Prior Publication Data

US 2021/0183228 A1 Jun. 17, 2021

(30) Foreign Application Priority Data

Dec. 16, 2019 (KR) ........................ 10-2019-0167472

(51) Int. Cl.
| | |
|---|---|
| B60Q 1/00 | (2006.01) |
| G08B 21/18 | (2006.01) |
| B60L 58/10 | (2019.01) |
| E05B 81/56 | (2014.01) |
| B60R 25/01 | (2013.01) |
| E05B 81/80 | (2014.01) |
| G07C 5/00 | (2006.01) |

(52) U.S. Cl.
CPC ............ *G08B 21/182* (2013.01); *B60L 58/10* (2019.02); *B60R 25/01* (2013.01); *E05B 81/56* (2013.01); *E05B 81/80* (2013.01); *G07C 5/008* (2013.01)

(58) Field of Classification Search
CPC ....... G08B 21/182; B60L 58/10; B60R 25/01; E05B 81/56; E05B 81/80; G07C 5/008
USPC ......................................................... 340/455
See application file for complete search history.

(56) References Cited

U.S. PATENT DOCUMENTS

| | | | | |
|---|---|---|---|---|
| 5,200,688 A | * | 4/1993 | Patino | H02J 7/0031 320/104 |
| 5,793,189 A | * | 8/1998 | Kawaguchi | B60L 58/15 322/28 |
| 6,271,745 B1 | * | 8/2001 | Anzai | G07C 9/00563 340/5.53 |
| 9,761,066 B2 | * | 9/2017 | Chen | G01R 31/343 |
| 2010/0124896 A1 | * | 5/2010 | Kumar | H04M 1/72418 455/404.1 |
| 2013/0093384 A1 | * | 4/2013 | Nyu | H02J 7/00 320/107 |
| 2014/0077771 A1 | * | 3/2014 | Yamashita | B60K 6/28 320/167 |
| 2015/0154816 A1 | * | 6/2015 | Chen | G01R 31/3835 701/29.1 |
| 2016/0292989 A1 | * | 10/2016 | Belk | H04N 21/4436 |

(Continued)

*Primary Examiner* — Zhen Y Wu
(74) *Attorney, Agent, or Firm* — Slater Matsil, LLP

(57) ABSTRACT

A vehicle includes a transceiver configured to communicate with a user terminal, a power supply device including a first battery configured to supply a driving current to at least one electronic device and a second battery, and a controller configured to generate a state information based on whether the first battery or the second battery is at risk of discharge determined based on a state of charge of the power supply device and to control the transceiver to transmit the generated state information to the user terminal.

17 Claims, 9 Drawing Sheets

(56) References Cited

U.S. PATENT DOCUMENTS

| | | | |
|---|---|---|---|
| 2017/0025869 A1* | 1/2017 | Lundholm | H02J 7/0013 |
| 2018/0366965 A1* | 12/2018 | Ghabra | H02J 7/0047 |
| 2019/0061685 A1* | 2/2019 | Lee | B60R 25/209 |
| 2019/0088104 A1* | 3/2019 | Crewe | G06K 9/00369 |
| 2019/0308556 A1* | 10/2019 | Hu | B60Q 9/00 |
| 2020/0189625 A1* | 6/2020 | Filippone | H02J 7/14 |

* cited by examiner

VEHICLE AND CONTROL METHOD OF THE VEHICLE

CROSS-REFERENCE TO RELATED APPLICATIONS

This application claims the benefit of Korean Patent Application No. 10-2019-0167472, filed on Dec. 16, 2019 in the Korean Intellectual Property Office, which application is hereby incorporated herein by reference.

TECHNICAL FIELD

The disclosure relates to a vehicle and a control method thereof.

BACKGROUND

A vehicle may include a battery that is always powered to provide various functions. The battery may be discharged by a dark current flowing in at least one electronic device inside the vehicle when the vehicle is off, and the discharge amount may increase as the off time elapses.

Accordingly, when the discharge amount exceeds a certain amount, a problem that the vehicle cannot be used may occur. For example, when the vehicle is provided with an electronic door device that operates by supplying power, when the discharge amount of the battery exceeds a certain amount, the operation for unlocking the door is impossible.

SUMMARY

Therefore, it is an embodiment of the disclosure to provide a vehicle capable of performing communication with an external device and a control method thereof.

In accordance with one embodiment of the disclosure, a vehicle includes a transceiver configured to communicate with a user terminal, a power supply device including a first battery configured to supply a driving current to at least one electronic device and a second battery, and a controller configured to generate a state information based on whether the first battery and the second battery are at risk of discharge determined based on a state of charge of the power supply device and control the transceiver to transmit the generated state information to the user terminal.

The controller may be configured to determine that there is a risk of discharge of the first battery when the charge amount of the first battery is equal to or less than a predetermined first reference value and generate a state information including at least one of discharge risk warning or remote start information for the first battery.

The controller may be configured to determine that the first battery is discharged when the charge amount of the first battery is equal to or less than a predetermined second reference value and generate a state information including at least one of a discharge warning for the first battery, charging information or emergency operation information of the second battery.

The controller may be configured to control the second battery to supply a driving current to the transceiver when the first battery is discharged.

The vehicle may further include a driver configured to lock or unlock a door, and the controller may include a first processor configured to authenticate a user based on a signal received from the user terminal and control the driver to unlock the door based on the authentication result, and a second processor configured to control the second battery to supply a driving current to the first processor when the first battery is discharged.

The vehicle may further include a switch configured to receive an emergency operation command from the user, and the second processor may be configured to control the second battery to supply a driving current to at least one of the transceiver, the first processor or the driver for a predetermined time when the emergency operation command is received.

The controller may be configured to determine that there is a risk of discharge of the second battery when the charge amount of the second battery is less than or equal to a predetermined third reference value and generate a state information including at least one of discharge risk warning for the second battery, charging information for the second battery, or external power information.

The vehicle may further include an external power input configured to be connected to external power and receive a driving current from the external power.

The controller may be configured to charge the second battery by the external power when the external power is detected through the external power input.

The vehicle may further include a driver configured to lock or unlock the door, and the controller may include a first processor configured to authenticate a user based on a signal received from the user terminal and control the driver to unlock the door based on the authentication result, and a second processor configured to transmit the driving current of the external power to at least one of the driver, the transceiver, or the first processor when the first battery and the second battery are discharged and the external power is connected to the external power input.

The controller may be configured to control the transceiver to transmit the generated state information to a surrounding vehicle or infrastructure device within a predetermined range.

In accordance with another embodiment of the disclosure, a control method of a vehicle including a transceiver configured to communicate with a user terminal and a power supply device including a first battery configured to supply a driving current to at least one electronic device and a second battery includes generating a state information based on whether the first battery and the second battery are at risk of discharge determined based on a state of charge of the power supply device, and transmitting the generated state information to the user terminal.

The generating the state information may include determining that there is a risk of discharge of the first battery when the charge amount of the first battery is equal to or less than a predetermined first reference value, and generating a state information including at least one of discharge risk warning or remote start information for the first battery.

The generating the state information may include determining that the first battery is discharged when the charge amount of the first battery is equal to or less than a predetermined second reference value, and generating a state information including at least one of a discharge warning for the first battery, charging information or emergency operation information of the second battery.

The control method may include supplying a driving current of the second battery to the transceiver when the first battery is discharged.

The control method may further include receiving an emergency operation command from a user, and when the emergency operation command is received, authenticating the user based on the signal received from the user terminal and unlocking the door based on the authentication result.

The generating the state information may include determining that there is a risk of discharge of the second battery when the charge amount of the second battery is less than or equal to a predetermined third reference value, and generating a state information including at least one of discharge risk warning for the second battery, charging information for the second battery, or external power information.

The control method may further include charging the second battery by external power when external power is detected.

The control method may further include transmitting the generated state information to a surrounding vehicle or infrastructure device within a predetermined range.

BRIEF DESCRIPTION OF THE DRAWINGS

These and/or other aspects of the invention will become apparent and more readily appreciated from the following description of the embodiments, taken in conjunction with the accompanying drawings of which.

DETAILED DESCRIPTION OF ILLUSTRATIVE EMBODIMENTS

Figure 1:
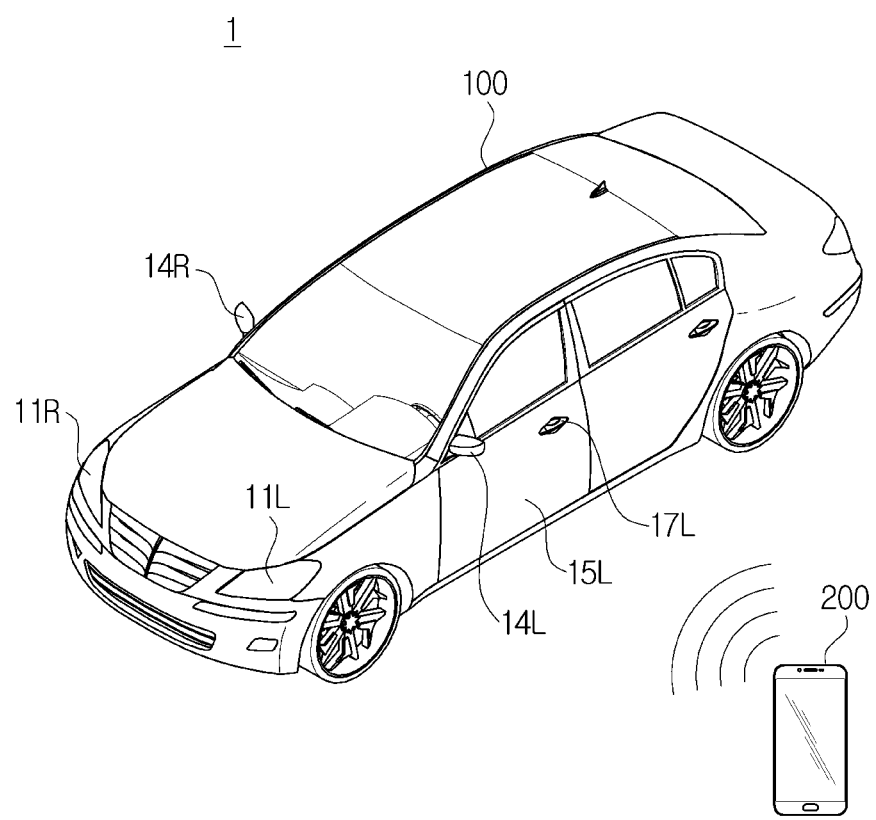
FIG. 1 is a view illustrating a relationship between a vehicle and a user terminal according to an embodiment of the disclosure.

In the following description, like reference numerals refer to like elements throughout the specification. This specification does not describe all elements of the embodiments. Terms such as "unit", "module", "member", and "block" may be embodied as hardware or software. According to embodiments, a plurality of "unit", "module", "member", and "block" may be implemented as a single component or a single "unit", "module", "member", and "block" may include a plurality of components.

It will be understood that when an element is referred to as being "connected" to another element, it can be directly or indirectly connected to the other element, wherein the indirect connection includes "connection via a wireless communication network".

Also, when a part "includes" or "comprises" an element, unless there is a particular description contrary thereto, the part may further include other elements, thus not excluding the other elements.

The terms first, second, etc. are used to distinguish one component from another component, and the component is not limited by the terms described above.

An expression used in the singular encompasses the expression of the plural, unless it has a clearly different meaning in the context.

The reference numerals used in operations are used for descriptive convenience and are not intended to describe the order of operations and the operations may be performed in a different order unless otherwise stated.

Hereinafter, embodiments of the present disclosure will be described with reference to the accompanying drawings.

FIG. 1 is a view illustrating a relationship between a vehicle and a user terminal according to an embodiment of the disclosure.

Referring to FIG. 1, a remote system 1 according to an embodiment includes a vehicle 100 and a user terminal 200.

The vehicle 100 and the user terminal 200 may be connected through a local area network. Here, the local area network means a communication network using a wireless LAN, a Wi-Fi, a Bluetooth, a ZigBee, a Wi-Fi Direct (WFD), an ultra wideband (UWB), an infrared data association (IrDA), a Bluetooth Low Energy (BLE), a Near Field Communication (NFC), and a radio frequency identification (RFID), but is not limited thereto.

The user terminal 200 may be implemented as a computer or a portable terminal that may access the vehicle 100 through a network. Here, the computer includes, for example, a laptop equipped with a WEB Browser, a desktop, a laptop, a tablet PC, a slate PC, and the like. The portable terminal is, for example, a wireless communication device that is guaranteed for portability and mobility, and may include all kinds of handheld-based wireless communication devices such as a Personal Communication System (PCS), a Global System for Mobile communications (GSM), a Personal Digital Cellular (PDC), a Personal Handyphone System (PHS), a Personal Digital Assistant (PDA), an International Mobile Telecommunication (IMT)-2000, a Code Division Multiple Access (CDMA)-2000, a W-Code Division Multiple Access (W-CDMA), a Wireless Broadband Internet (WiBro) terminal, Smart Phone, and may include a wearable device such as a watch, ring, bracelet, anklet, necklace, glasses, contact lenses, or a head-mounted-device (HMD).

The vehicle 100 may receive a search signal from the user terminal 200 to provide various user convenience functions such as remote control by a user through the user terminal 200. In this case, the search signal may mean an advertising packet signal.

For example, when the touch sensing unit of the doors 15L and 15R detects the user's touch input while the user possesses the user terminal 200 registered in the vehicle 100, the vehicle 100 performs authentication with the user terminal 200 through a wireless communication network. And when the authentication is completed, the door lock of the vehicle 100 is released, and the doors 15L and 15R may be opened by pulling the user's handles 17L and 17R. Here, the user includes not only the driver but also a passenger in the vehicle 100, and means a person having a user terminal 200.

In addition, when the vehicle 100 is confirmed that the position of the user terminal 200 is close, a welcome light function, such as turning on the lamps provided in the headlights 11L and 11R of the vehicle 100 or the handles 17L and 17R, may be provided.

Such various convenience functions may be provided regardless of whether the vehicle 100 is started, and for this purpose, a battery that is a constant power may be provided in the vehicle 100.

The battery may be discharged by a dark current flowing in at least one electronic device inside the vehicle 100 when the vehicle 100 is off, and the discharge amount may increase as the off time elapses. Accordingly, when the discharge amount exceeds a certain amount, a problem that the vehicle 100 cannot be started may occur.

Accordingly, the vehicle 100 according to an embodiment may prevent problems that may occur due to discharge of the power supply device 140 by providing information about the state of charge of the power supply device 140 to the user step by step.

Hereinafter, the operation of the vehicle 100 according to an embodiment will be described in detail with reference to FIGS. 2A, 2B, 3A, and 3B.

Figure 2A:
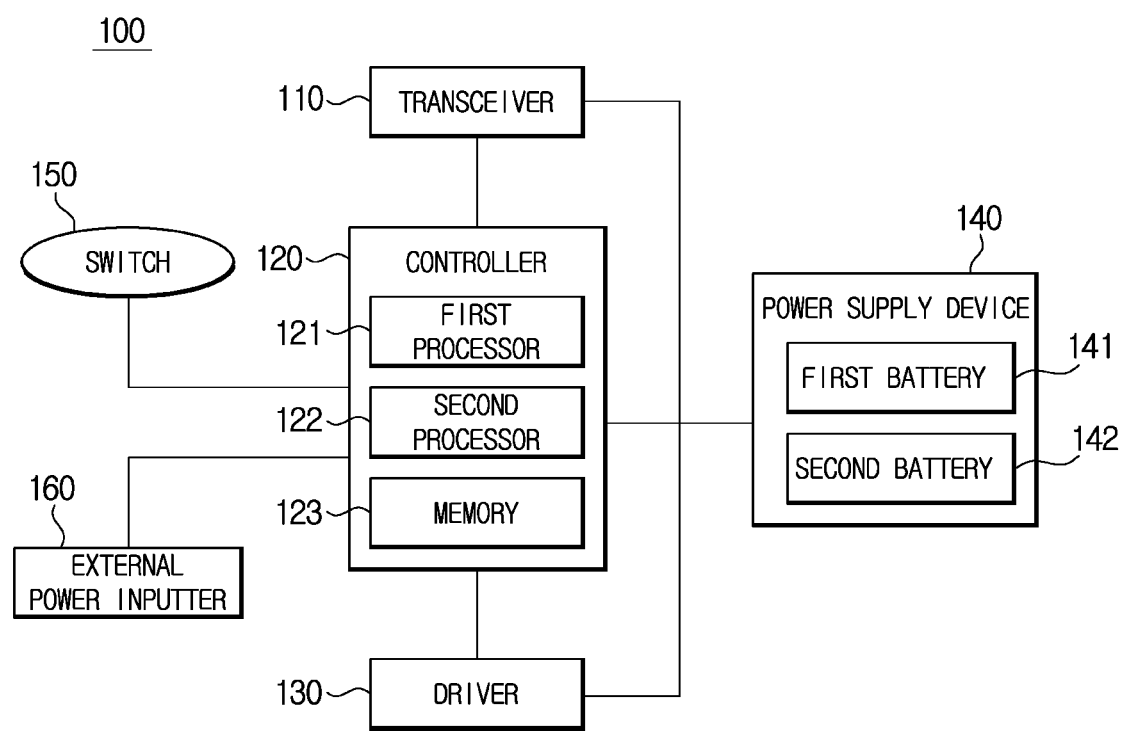
FIG. 2A is a control block diagram of a vehicle according to an embodiment of the disclosure.
Figure 2B:
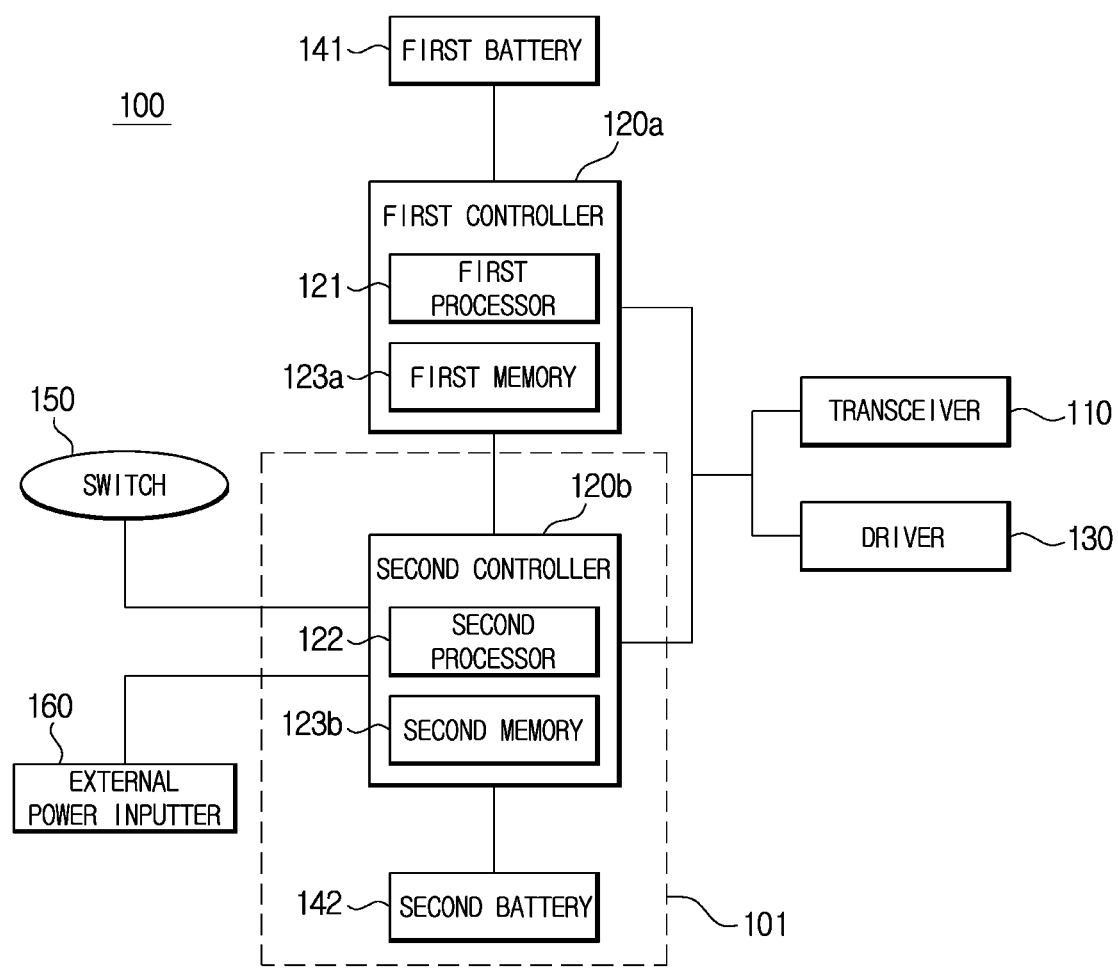
FIG. 2B is a control block diagram of a vehicle according to another embodiment of the disclosure.
Figure 3A:
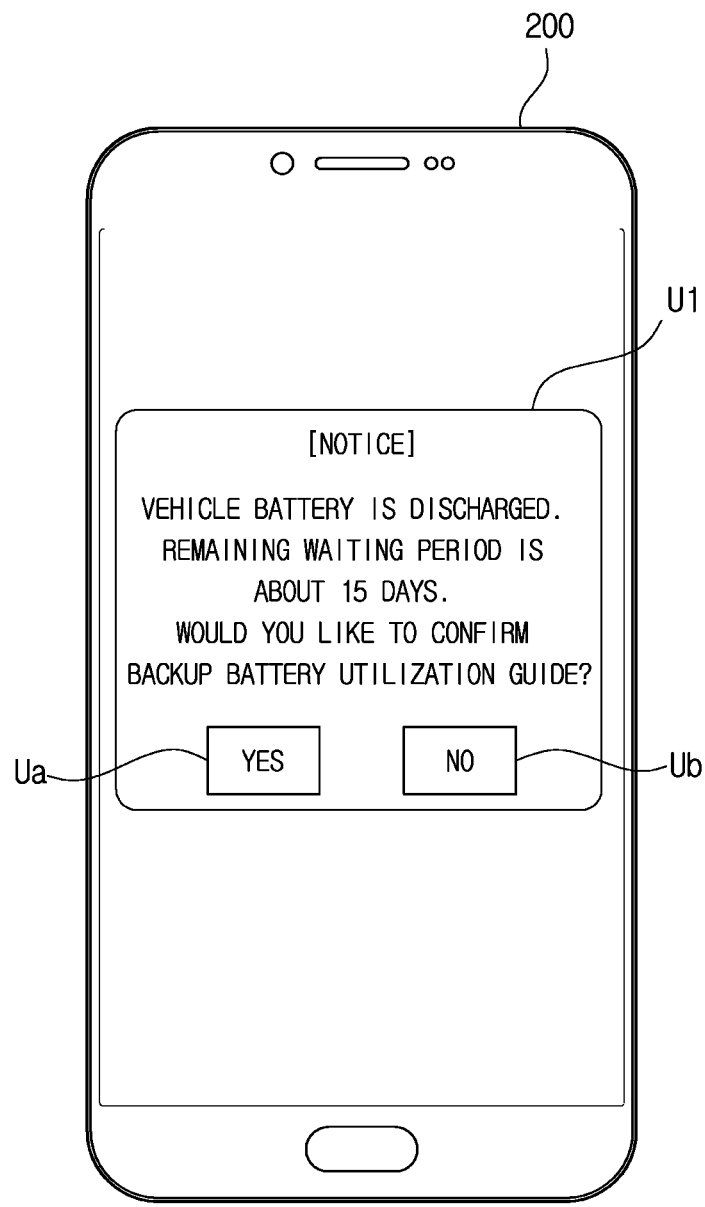
FIGS. 3A and 3B are views illustrating examples of state information transmitted by a vehicle according to an embodiment of the disclosure to a user terminal.
Figure 3B:
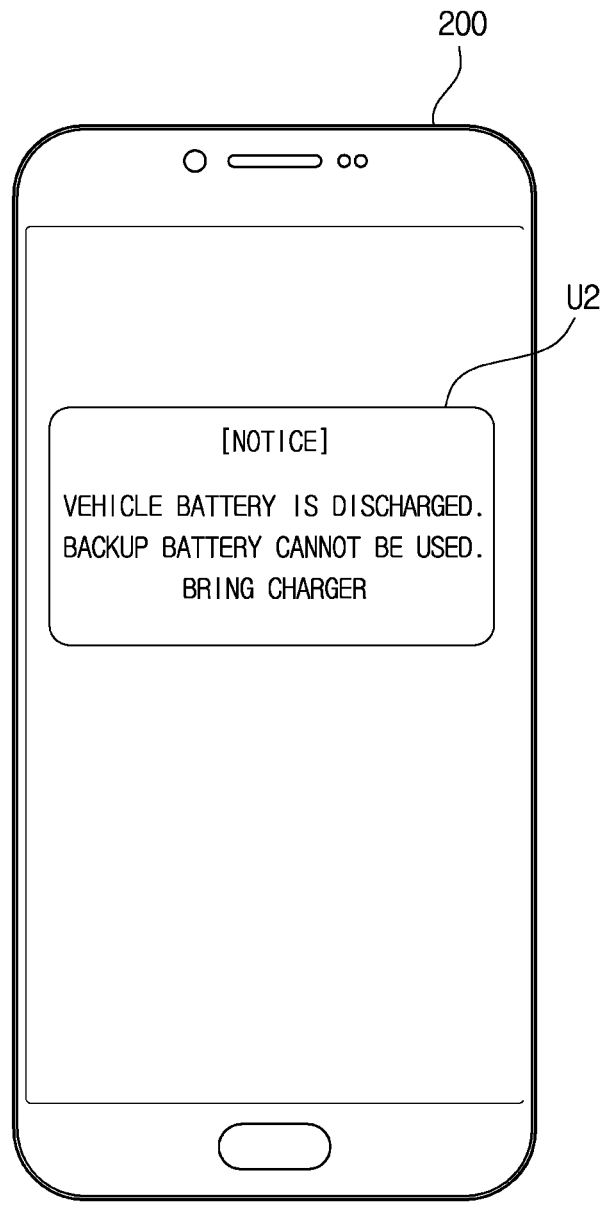

FIG. 2A is a control block diagram of a vehicle according to an embodiment of the disclosure. FIG. 2B is a control block diagram of a vehicle according to another embodiment of the disclosure. FIGS. 3A and 3B are views illustrating examples of state information transmitted by a vehicle according to an embodiment of the disclosure to a user terminal.

Referring to FIG. 2A, the vehicle 100 according to an embodiment may include a transceiver 110, a driver 130, a power supply device 140, and a controller 120 that controls overall components inside the vehicle 100, a switch 150 and an external power input (inputter) 160.

The transceiver 110 may communicate with various external devices including the user terminal 200.

The external device may include an infrastructure device such as a base station, a server (not shown), and a surrounding vehicle.

The transceiver 110 may receive a search signal from the user terminal 200 and transmit various information to the user terminal 200 under the control of the controller 120. In addition to this, the transceiver 110 may transmit and receive various information with various external devices.

To this end, the transceiver 110 may include one or more components that enable communication with external devices. For example, the transceiver 110 may include at least one of a short-range communication module, a wired communication module, and a wireless communication module.

The short range communication module may include various local area communication modules for transmitting and receiving signals using a wireless communication network such as a Bluetooth module, an infrared communication module, a radio frequency identification (RFID) communication module, a wireless local access network (WLAN) communication module, an NFC communication module, a ZigBee communication module, or the like.

The wired communication module can be a variety of wired devices such as a controller area network (CAN) module, a local area network (LAN) module, a wide area network (WAN) module, or a value added network (VAN) module, and can also include various cable communication modules such as Universal Serial Bus (USB), High Definition Multimedia Interface (HDMI), Digital Visual Interface (DVI), returned standard232 (RS-232), power line communication, or plain old telephone service (POTS).

In addition to the WiFi module and the Wireless broadband module, the wireless communication module supporting a wireless communication scheme may include Global System for Mobile Communication (GSM), Code Division Multiple Access (CDMA), Wideband Code Division Multiple Access (WCDMA), Universal Mobile Telecommunications System (UMTS), Time Division Multiple Access (TDMA), and/or Long Term Evolution (LTE).

The wireless communication module may include a wireless communication interface including an antenna for transmitting a signal and a transmitter. The wireless communication module may further include a signal conversion module configured to modulate the digital control signal output from the controller 120 into an analog type wireless signal through the wireless communication interface under the control of the controller 120.

The wireless communication module may include a wireless communication interface including an antenna for receiving a signal and a receiver. The wireless communication module may further include a signal conversion module for demodulating the analog signal received through the wireless communication interface into a digital control signal. Also, the wireless communication module may further include a signal conversion module for demodulating the analog signal received through the wireless communication interface into a digital control signal.

The power supply device 140 may supply a driving current to at least one electronic device inside the vehicle 100.

In addition, the power supply device 140 may also serve to drive a starter motor at start-up and supply spare power in the event of a generator failure.

The power supply device 140 may include a first battery 141 and a second battery 142 electrically connected to electronic devices inside the vehicle 100 to supply driving power.

The first battery 141 and second battery 142 are called a storage battery or a secondary battery, and when the vehicle 100 is stopped, generate electrical energy by a chemical action occurring in the battery, and are electrically connected to the electronic component 130 included in the vehicle 100 to supply driving power. The first battery 141 and second battery 142 may be configured to be charged and discharged.

The state of charge of the power supply device 140 may be detected by a battery sensor (not shown). The battery sensor (not shown) may detect a current state of charge (SOC) of the first battery 141 or the second battery 142 included in the power supply device 140, state of health (SOH), state of function (SOF), temperature, replacement history, etc.

The state of charge of the power supply device 140 is transmitted to the controller 120 and may be used as a control basis.

Meanwhile, the first battery 141 may be a vehicle battery that supplies driving power to at least one component of the vehicle 100, and the second battery 142 may refer to a backup battery provided in case the first battery 141 is unable to supply driving power due to discharge or failure of the first battery 141.

The driver 130 may lock or unlock the door 15L. To this end, the driver 130 may include at least one among an actuator such as driving motor that provides driving force for locking or unlocking the door 15L, a power transmission mechanism such as worm and worm heel to transmit driving force and a latch operated to lock or unlock the door 15L by the driving force transmitted through the power transmission mechanism.

The switch 150 may receive various inputs from a user. For example, in case of an emergency due to discharge of the power supply device 140, the user may input a command for emergency access to the vehicle 100 by turning on the switch 150.

To this end, the switch 150 may be provided on the outer surface of the vehicle 100.

The external power input 160 may be provided on the outer surface of the vehicle 100 so that emergency power supplied from the outside can be supplied to at least one component of the vehicle 100 from the outside of the vehicle 100.

To this end, the external power input 160 may include an interface device using various power supply methods. For example, the external power input 160 may receive emergency power from external power using a USB power supply method. However, the disclosure is not limited thereto, and various power supply methods such as short-range communication methods such as NFC may be used.

The controller 120 may include a first processor 121 and a second processor 122.

The first processor 121 may authenticate the user terminal based on the signal received from the user terminal 200, and may control the driver 130 to unlock the door 15L based on the authentication result.

To this end, the first processor 121 may control the transceiver no to transmit an authentication signal to the user terminal 200. When a response signal corresponding to the authentication signal is received from the user terminal 200, the first processor 121 may authenticate the user terminal 200 based on the response signal.

Specifically, the first processor 121 may compare user information included in the signal received from the user terminal 200 with user information stored in advance, and authenticate the user terminal based on the comparison result.

The first processor 121 may receive a driving current from the first battery 141 or the second battery 142. At this time, a configuration in which the first processor 121 receives a driving current may be changed based on the state of charge of the first battery 141 and the second battery 142.

When the first battery 141 is in a normal state, that is, when the charge amount is greater than or equal to a predetermined reference charge amount or when the driving current is greater than or equal to a predetermined reference current amount, the first processor 121 may receive a driving current from the first battery 141.

When the first battery 141 is discharged, that is, when the charge amount is less than a predetermined reference charge amount or when the driving current is less than a predetermined reference current amount, the first processor 121 may receive a driving current from the second battery 142.

When both the first battery 141 and the second battery 142 are discharged, the first processor 121 may receive a driving current from external power. This will be described later.

The second processor 122 may check at least one of state of charge of the first battery 141 or the second battery 142 included in the power supply device 140, and may transmit state information regarding at least one of the first battery 141 or the second battery 142 to the user terminal 200.

In addition, the second processor 122 may update state information regarding at least one of state of charge of the first battery 141 or the second battery 142, and transmit the updated state information to the user terminal 200.

The state information may include a state of charge including a charge amount of a battery, and may include at least one of a waiting time expected to be discharged, whether to discharge, whether to fail, and user guide information.

The user guide information refers to information recommendable to a user based on the state of the first battery 141 or the second battery 142. The user guide information may include at least one of remote start information, emergency operation information, or external power information, and may be distinguished for each operation mode.

This state information may be generated by the controller 120.

The second processor 122 may generate state information based on whether the first battery 141 or the second battery 142 is at risk of discharge.

Specifically, the second processor 122 may determine the operation mode based on whether the first battery 141 or the second battery 142 is discharged, and may generate state information suitable for the operation mode.

More specifically, when the charge amount of the first battery 141 is equal to or less than a predetermined first reference value, the second processor 122 may determine that there is a risk of discharge of the first battery 141, and determine an operation mode as the first mode. In the first mode, the second processor 122 may generate state information including at least one of discharge risk warning or remote start information for the first battery 141.

As the user guide information, remote start information means information for requesting a remote start from the user. When it is determined that there is a risk of discharge to the first battery 141, the second processor 122 may determine remote start information as user guide information.

When the user transmits a remote start command to the vehicle 100 according to the remote start information, the second processor 122 may start the vehicle 100 according to a remote start command and charge the first battery 141.

In addition, when it is determined that there is a risk of discharge of the first battery 141, the second processor 122 may determine a waiting time expected to be discharged based on a charge amount of the first battery 141, and may provide the determined waiting time along with a discharge risk warning.

When the charge amount of the first battery 141 is less than or equal to a predetermined second reference value, the second processor 122 may determine that the first battery 141 is discharged, and may determine the operation mode as the second mode. In the second mode, that is, when the first battery 141 is discharged, the second processor 122 may generate state information including at least one of a discharge warning for the first battery 141, charging information for the second battery 142, or emergency operation information.

In this case, the second reference value means a reference value for estimating the discharge of the first battery 141, and may be smaller than the first reference value described above.

The charging information of the second battery 142 may include a state of charge of the second battery 142, a waiting time expected to be discharged, whether to discharge, or whether to fail. To this end, the second processor 122 may calculate an expected waiting time until discharge based on the capacity and state of charge of the second battery 142.

As the user guide information, emergency operation information means information for access to the vehicle 100 in preparation for an emergency situation according to discharge of the first battery 141, and may include information for using the second battery 142.

For example, as shown in FIG. 3A, in the second mode, the second processor 122 may generate emergency operation information including a discharge warning that the first battery 141 is discharged, an expected waiting time until discharge of the second battery 142 and information for using the second battery 142 to access the vehicle 100 as state information.

The state information in the second mode may be visually output through the interface U1 of the user terminal 200. At this time, the interface U1 may further include separate buttons Ua and Ub for receiving an input request for emergency operation information from the user.

In the second mode, the second processor 122 may change the configuration that supplies driving current to at least one configuration included in the vehicle 100 from the first battery 141 to the second battery 142. The second processor 122 may control the second battery 142 to supply a driving current to at least one of the first processor 121, the transceiver 110, or the driver 130.

Specifically, when the first battery 141 is discharged, the second processor 122 may control the second battery 142 to supply driving current to at least one of the first processor 121, the transceiver 110, or the driver 130 for a predetermined time. Therefore, even when the first battery 141 is discharged, the transceiver 110 may receive a signal from the user terminal 200 by the driving current supplied from the second battery 142, the first processor 121 may authenticate the user terminal, and the driver 130 may unlock the door.

Alternatively, in the second mode performed according to the first battery 141 discharge, when an emergency operation command is received through the switch 150 from the user, the second processor 122 controls the second battery 142 to supply driving current to at least one of the first processor 121, the transceiver no, or the driver 130 for a predetermined time from the time the emergency operation command is received.

Therefore, since the driving current is supplied from the second battery 142 only when an emergency operation command is received from the user, it is possible to maximize the waiting time according to the remaining charge amount of the second battery 142. Accordingly, convenience of a user may be increased by preventing a situation in which both the first battery 141 and the second battery 142 are discharged.

When the charge amount of the second battery 142 is below a predetermined third reference value, the second processor 122 may determine that there is a risk of discharge of the second battery 142, and may determine the operation mode as the third mode. In the third mode, state information including at least one of discharge risk warning for the second battery 142, charging information for the second battery 142, or external power information may be generated.

Also, in the third mode, when the first battery 141 is discharged, the second processor 122 may generate state information including at least one of a discharge warning for the first battery 141, a discharge risk warning for the second battery 142, charging information for the second battery 142, or external power information.

As user guide information, the external power information means information for requesting input of external power to the user. If it is determined that there is a risk of discharge to the second battery 142, the second processor 122 may determine external power information as user guide information.

When the user inputs external power according to external power information, the external power input 160 may detect external power. When external power is detected through the external power input 160, the second processor 122 may charge the second battery 142 based on external power.

Meanwhile, the second processor 122 may determine whether the charging condition of the second battery 142 is satisfied based on the state of charge of the second battery 142, and when the charging condition of the second battery 142 is satisfied, may charge the second battery 142.

For example, when at least one of whether a vehicle starts, whether the charging of the second battery 142 is completed, stabilization voltage when charging is completed, temperature, driving voltage, or driving current satisfies a predetermined condition, the second processor 122 may determine that the charging condition of the second battery 142 is satisfied, and may charge the second battery 142.

When the charge amount of the second battery 142 is less than or equal to a predetermined fourth reference value, the second processor 122 may determine that the discharge risk of the second battery 142 is high.

When it is determined that the first battery 141 is discharged and the risk of discharge of the second battery 142 is high, the second processor 122 may determine the operation mode as the fourth mode.

In the fourth mode, the second processor 122 may generate a state information including at least one of discharge warning for the first battery 141, discharge risk warning for the second battery 142, charging information for the second battery 142, or external power information.

At this time, the fourth reference value means the minimum charge amount required to drive the first processor 122 or the driver 130, and may be smaller than the third reference value for determining the discharge risk of the second battery 142 described above.

In the fourth mode, the second processor 122 may identify that the state of the second battery 142 is a state in which the first processor 122 or the driver 130 cannot be driven and may determine external power information requesting external power input as a user guide information.

For example, as shown in FIG. 3B, the second processor 122 may generate charging information indicating that the state of the second battery 142 is unavailable with the discharge warning for the first battery 141 and external power information that requests external power input as state information corresponding to the fourth mode.

The state information in the fourth mode may be transmitted to the user terminal 200, and may be visually output through the interface U2 of the user terminal 200.

Therefore, the user may be provided with a step-by-step warning about the risk of discharge according to the state of charge of the first battery 141 and the second battery 142, thereby preventing an emergency situation due to discharge. At the same time, the user may be provided with user guide information suitable for the state of charge of the first battery 141 and the second battery 142, so that user convenience may be increased.

When both the first battery 141 and the second battery 142 are discharged and external power is input through the first external power input 160, the second processor 122 may determine the operation mode as the fifth mode.

At this time, the second processor 122 may be deactivated as both the first battery 141 and the second battery 142 are discharged before external power is input through the first external power input 160. When external power is input, the second processor 122 may be activated by a driving current supplied from external power, and may perform a fifth mode.

In the fifth mode, the second processor 122 may confirm whether the external power may supply a predetermined reference power or higher based on the state of the external power.

When the external power may supply the predetermined reference power or higher, the second processor 122 may supply driving current of external power to the first processor 121. The first processor 121 may authenticate the user terminal 200 by driving current from external power. When the user terminal 200 is authenticated, the second processor 122 may supply a driving current of external power to the driver 130, and the driver 130 may unlock the door 15L.

Accordingly, even when both the first battery 141 and the second battery 142 are discharged, at least one configuration for unlocking the door 15L of the vehicle 100 may be driven by external power. Therefore, since the vehicle 100 may be accessed even in an emergency situation in which both the first battery 141 and the second battery 142 are discharged, user convenience may be increased.

Meanwhile, the second processor 122 may control the transceiver no to transmit state information suitable for the state of charge of the power supply device 140 to not only the user terminal 200 but also an external device including a surrounding vehicle, an infrastructure device, a server, and the like.

At this time, the transceiver 110 and the external devices such as a user terminal 200, a surrounding vehicle, an infrastructure device, and a server may communicate through various wireless communication methods, and the description thereof is the same as described above.

Specifically, the second processor 122 may simultaneously transmit state information to external devices such as surrounding vehicle, infrastructure devices, and servers located within a predetermined range from the user terminal 200 and vehicle 100.

Alternatively, the second processor 122 may first transmit state information to the user terminal 200, and when the response signal is not received from the user terminal 200 for a predetermined time, may transmit state information to external devices such as a surrounding vehicle, an infrastructure device, and a server.

Alternatively, the second processor 122 may transmit state information to an external device such as a surrounding vehicle, an infrastructure device, or a server when the number of state information transmissions to the user terminal 200 is greater than or equal to a predetermined number of times.

Through this, since it is possible to transmit state information related to the discharge of the vehicle 100 to various external devices as well as the user terminal 200, problems that may occur due to discharge of the power supply device 140 may be prevented.

Meanwhile, the controller 150 may be implemented by a memory 123 for storing an algorithm for controlling the operation of components in the vehicle 100 or data for the program that reproduces the algorithm, and a processor 121, 122 for performing the above-described operation using the data stored in the memory 123. In this case, the memory 123 and the processor 121, 122 may be implemented as separate chips. Alternatively, the memory and the processor may be implemented in a single chip.

In FIG. 2A, it is described that the first processor 121 and the second processor 122 are all included in one controller 120, but according to an embodiment, the first processor 121 and the second processor 122 may be included in separate configurations, respectively. Specifically, as shown in FIG. 2B, the vehicle 100 according to another embodiment includes a first controller 120a including a transceiver 110, a driver 130, and a first processor 121, a second controller 120b including a second processor 122, a switch 150, an external power input 160, a first battery 141, and a second battery 142, and the description of each configuration is the same as described above.

The first controller 120a may include a first processor 121 and a first memory 123a. The description of the first processor 121 is the same as described above, and the first memory 123a may store information necessary for the first processor 121 to authenticate the user terminal.

The second controller 120b may include a second processor 122 and a second memory 123b. The description of the second processor 122 is the same as described above, and the second memory 123b may store information necessary for the second processor 122.

In the embodiment of FIG. 2B, the second controller 120b may configure the auxiliary power supply 101 together with the second battery 142.

The auxiliary power supply 101 may further include at least one of a switch 150 or an external power input 160 in addition to the second controller 120b and the second battery 142.

The auxiliary power supply 101 may be installed to be detachably attached to the vehicle 100. When the auxiliary power supply 101 is installed in the vehicle 100, the auxiliary power supply 101 may be electrically connected to other components of the vehicle 100 shown in FIG. 2B.

At least one component may be added or deleted to correspond to the performance of the components of the vehicle 100 illustrated in FIG. 2A and FIG. 2B. In addition, it will be readily understood by those skilled in the art that the mutual position of the components may be changed corresponding to the performance or structure of the system.

Meanwhile, each component illustrated in FIG. 2A and FIG. 2B refers to a software and/or a hardware component such as software and/or a field programmable gate array (FPGA) and an application specific integrated circuit (ASIC).

Figure 4:
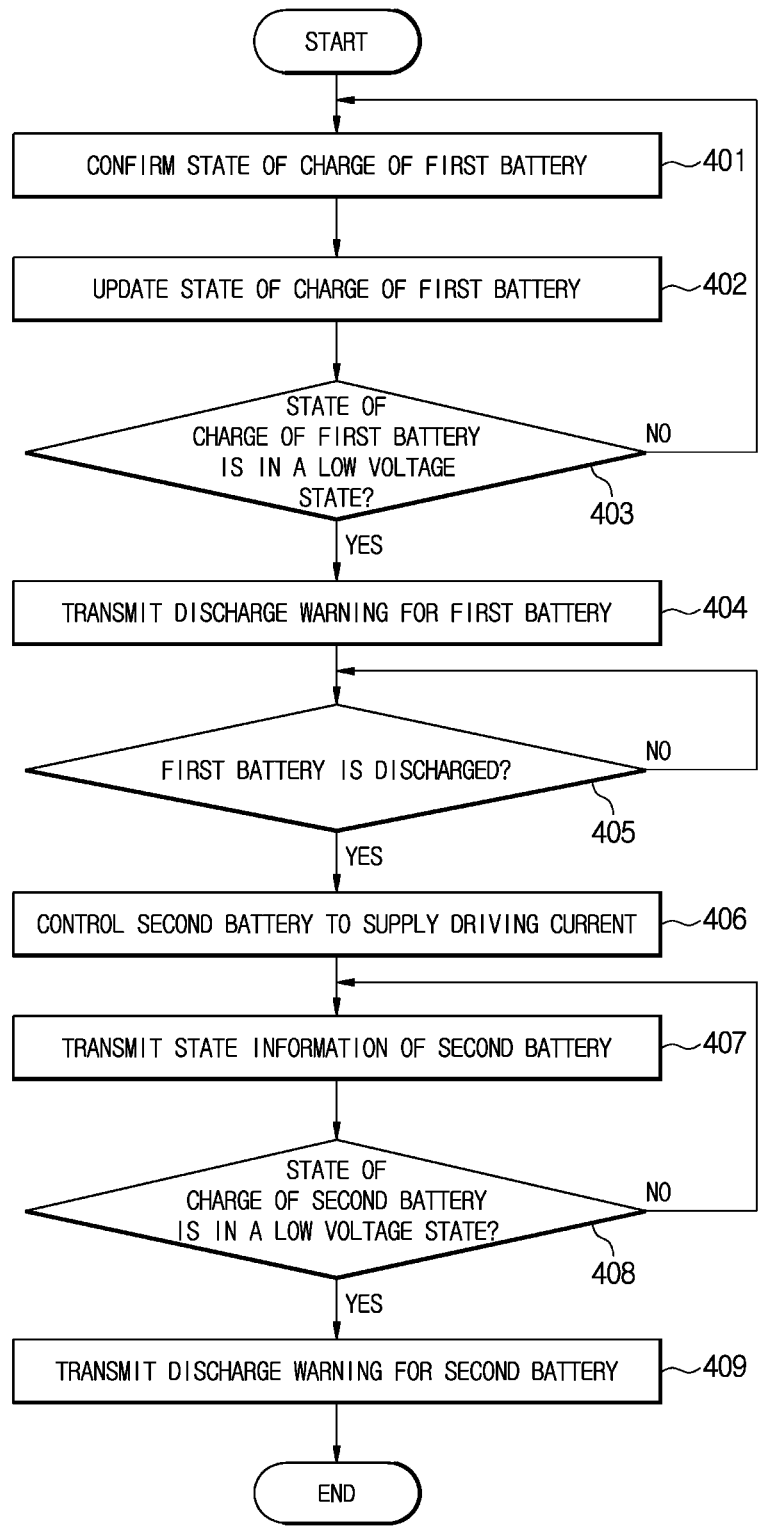
FIG. 4 is a flowchart of a control method of a vehicle according to an embodiment of the disclosure.

FIG. 4 is a flowchart of a control method of a vehicle according to an embodiment of the disclosure.

Referring to FIG. 4, the second processor 122 of the vehicle 100 according to an embodiment may confirm the state of charge of the first battery 141 (401), and update the state of charge of the first battery 141 and transmit it to the user terminal 200 (402).

The second processor 122 may confirm whether the state of charge of the first battery 141 is in a low voltage state (403). Specifically, when the charge amount of the first battery 141 is less than or equal to a predetermined first reference value, the second processor 122 may confirm that the state of charge of the first battery 141 is in a low voltage state. That is, the second processor 122 may determine that there is a risk of discharge of the first battery 141, and may determine the operation mode as the first mode.

When the state of charge of the first battery 141 is a low voltage state (YES in 403), the second processor 122 may transmit a discharge warning for the first battery 141 to the user terminal 200 (404). At this time, the discharge warning for the first battery 141 may include a discharge risk warning. Alternatively, the second processor 122 may transmit remote start information to the user terminal 200 along with a discharge risk warning for the first battery 141.

Next, the second processor 122 may confirm whether the first battery 141 is discharged (405). Specifically, when the charge amount of the first battery 141 is less than or equal to a predetermined second reference value, the second processor 122 may confirm that the first battery 141 is discharged. In this case, the second processor 122 may determine the operation mode as the second mode.

Meanwhile, the second reference value means a reference value for estimating the discharge of the first battery 141, and may be smaller than the first reference value described above.

When the first battery 141 is discharged (YES in 405), the second processor 122 may control the second battery 142 to supply a driving current to at least one configuration inside the vehicle 100 (406). In this case, at least one of the first processor 121, the transceiver 110, or the driver 130 of the vehicle 100 may receive a driving current from the second battery 142.

The second processor 122 may transmit state information of the second battery 142 to the user terminal 200 (407). Specifically, the second processor 122 may transmit at least one of a discharge warning for the first battery 141, charging information of the second battery 142, or emergency operation information to the user terminal 200.

Thereafter, the second processor 122 may confirm whether the state of charge of the second battery 142 is a low voltage state (408). Specifically, when the charge amount of the second battery 142 is less than or equal to a predetermined third reference value, the second processor 122 may confirm that the state of charge of the second battery 142 is a low voltage state. In this case, the second processor 122 may determine the operation mode as the third mode.

When the state of charge of the second battery 142 is a low voltage state (YES in 408), the second processor 122 may transmit a discharge warning for the second battery 142 to the user terminal 200 (409). At this time, the discharge warning for the second battery 142 may include a discharge risk warning.

Alternatively, the second processor 122 may transmit at least one of charging information or external power information for the second battery 142 to the user terminal 200 along with a discharge risk warning for the second battery 142 (409).

Through this, the second processor 122 may provide a step-by-step warning of a discharge risk according to the state of charge of the first battery 141 and the second battery 142, thereby preventing an emergency situation due to discharge. At the same time, since the user may be provided with user information suitable for the state of charge of the first battery 141 and the second battery 142, user convenience may be increased.

Meanwhile, in steps 404, 407, and 409, the second processor 122 is described as transmitting discharge warning or state information to the user terminal 200, but it is also possible for the second processor 122 to transmit to an external device including a surrounding vehicle, an infrastructure device, and a server.

Figure 5:
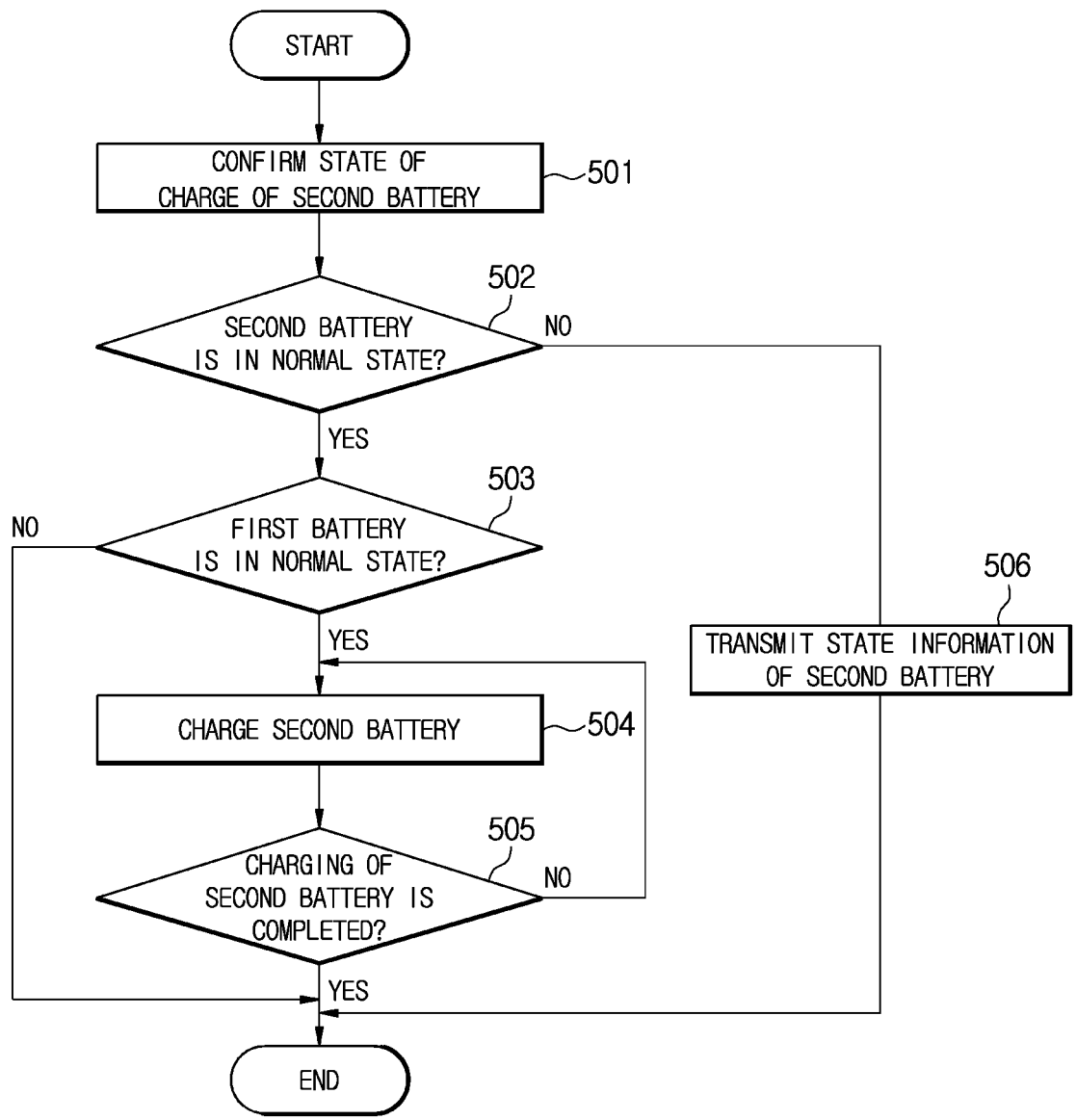
FIG. 5 is a flowchart of a control method of a vehicle according to another embodiment of the disclosure.

FIG. 5 is a flowchart of a control method of a vehicle according to another embodiment of the disclosure.

Referring to FIG. 5, the second processor 122 of the vehicle 100 according to an embodiment may confirm the state of charge of the second battery 142 (501).

When the charge amount of the second battery (142) is less than or equal to a predetermined reference charge amount, the second processor 122 may confirm whether the second battery 142 is in a normal state to charge the second battery 142 (502).

Specifically, the second processor 122 may confirm whether the second battery 142 is in a normal state based on at least one of the state of charge of the second battery 142, whether charging is completed, stabilization voltage when charging is completed, temperature, driving voltage, or driving current.

When the second battery 142 is in a normal state (YES in 502), the second processor 122 may confirm whether the first battery 141 is in a normal state (503).

Specifically, the second processor 122 may confirm that the first battery 141 is in a normal state when at least one of the state of charge of the first battery 141, whether charging is completed, stabilization voltage when charging is completed, temperature, driving voltage, or driving current satisfies a predetermined condition.

When the first battery 141 is in a normal state (YES in 503), the second processor 122 may charge the second battery 142 (504). In this case, when the start-up is turned on, the second processor 122 may charge the second battery 142.

Thereafter, the second processor 122 may confirm whether the charging of the second battery 142 is completed (505), and may charge the second battery 142 until charging of the second battery 142 is completed.

As another example, in step 502, when the second battery 142 is not in a normal state (NO in 502), the second processor 122 may confirm that the second battery 142 is defective.

In this case, the second processor 122 may transmit state information of the second battery 142 to an external device (506), the state information of the second battery 142 may include whether the second battery 142 has failed. At this time, the external device may include at least one of a user terminal 200, a surrounding vehicle, an infrastructure device, or a server.

Through this, since the discharge of the second battery 142 may be prevented, and at the same time, the state information including whether the second battery 142 has failed may be provided to the user, the user convenience may be increased.

Figure 6:
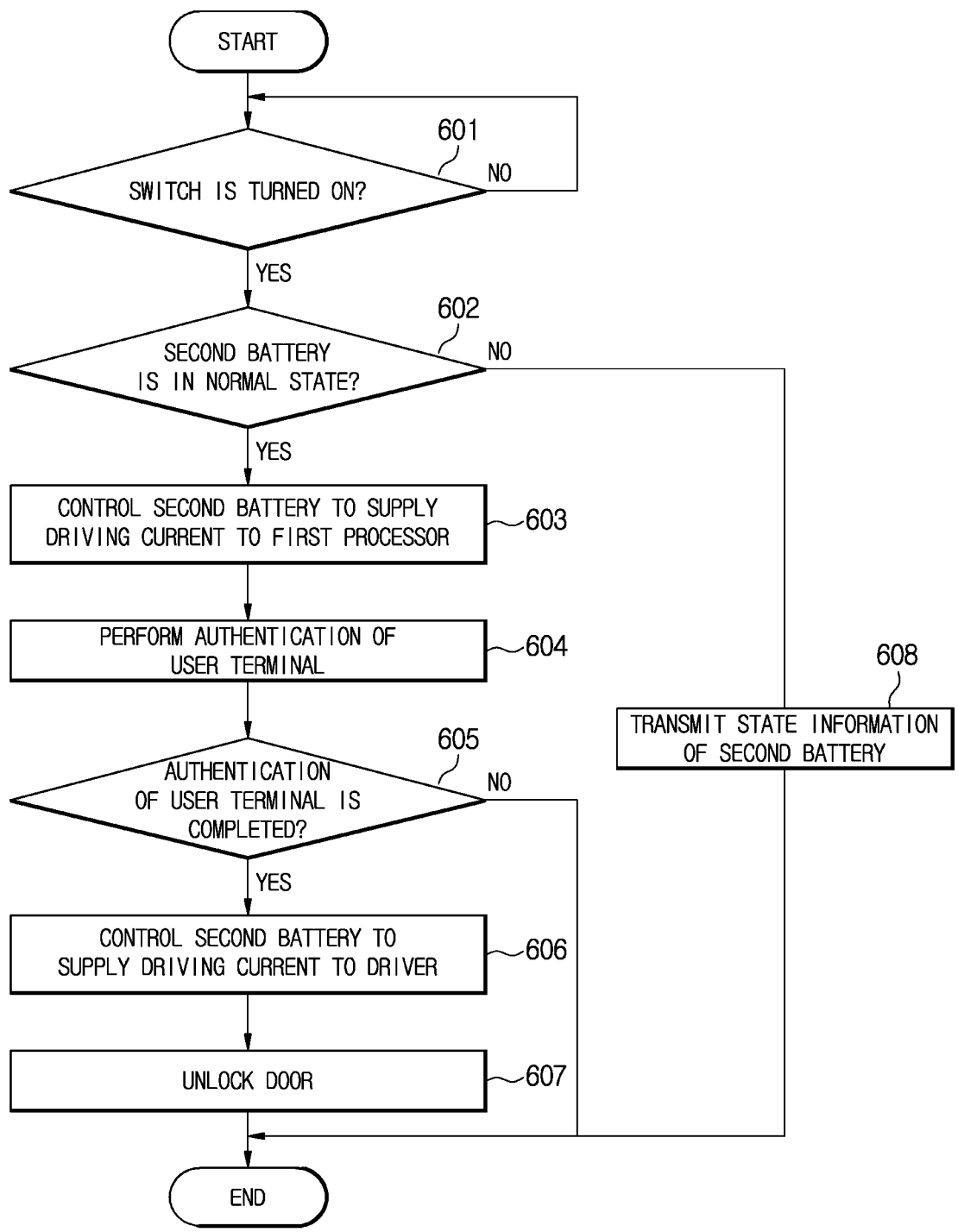
FIG. 6 is a flowchart of a control method of a vehicle according to another embodiment of the disclosure.

FIG. 6 is a flowchart of a control method of a vehicle according to another embodiment of the disclosure.

Referring to FIG. 6, the second processor 122 of the vehicle 100 according to an embodiment may confirm whether the switch 150 is turned on in the second mode performed according to the discharge of the first battery 141 (601).

When the switch 150 is turned on (YES in 601), the second processor 122 may identify that an emergency operation command is received, and may confirm whether the second battery 142 is in a normal state (602).

When the second battery (142) is in a normal state (YES in 602), the second processor 122 may control the second battery 142 to supply a driving current to the first processor 121.

By driving current supplied from the second battery 142, the first processor 121 may perform authentication of the user terminal (604).

When authentication of the user terminal is completed (YES in 605), the second processor 122 may control the second battery 142 to supply a driving current to the driver 130 (606), and the driver 130 may unlock the door 15L (607).

As another example, when the second battery 142 is not in a normal state (NO in 602), the second processor 122 may confirm that the second battery 142 is defective.

In this case, the second processor 122 may transmit state information of the second battery 142 to the external device (608), and the state information of the second battery 142 may include whether the second battery 142 has failed. At this time, the external device may include at least one of a user terminal 200, a surrounding vehicle, an infrastructure device, or a server.

Even in the situation where the first battery 141 is discharged, the user may have access to the vehicle 100 by the power supplied by the second battery 142 by inputting an emergency operation command through the switch 150. Therefore, user convenience may be increased.

Figure 7:
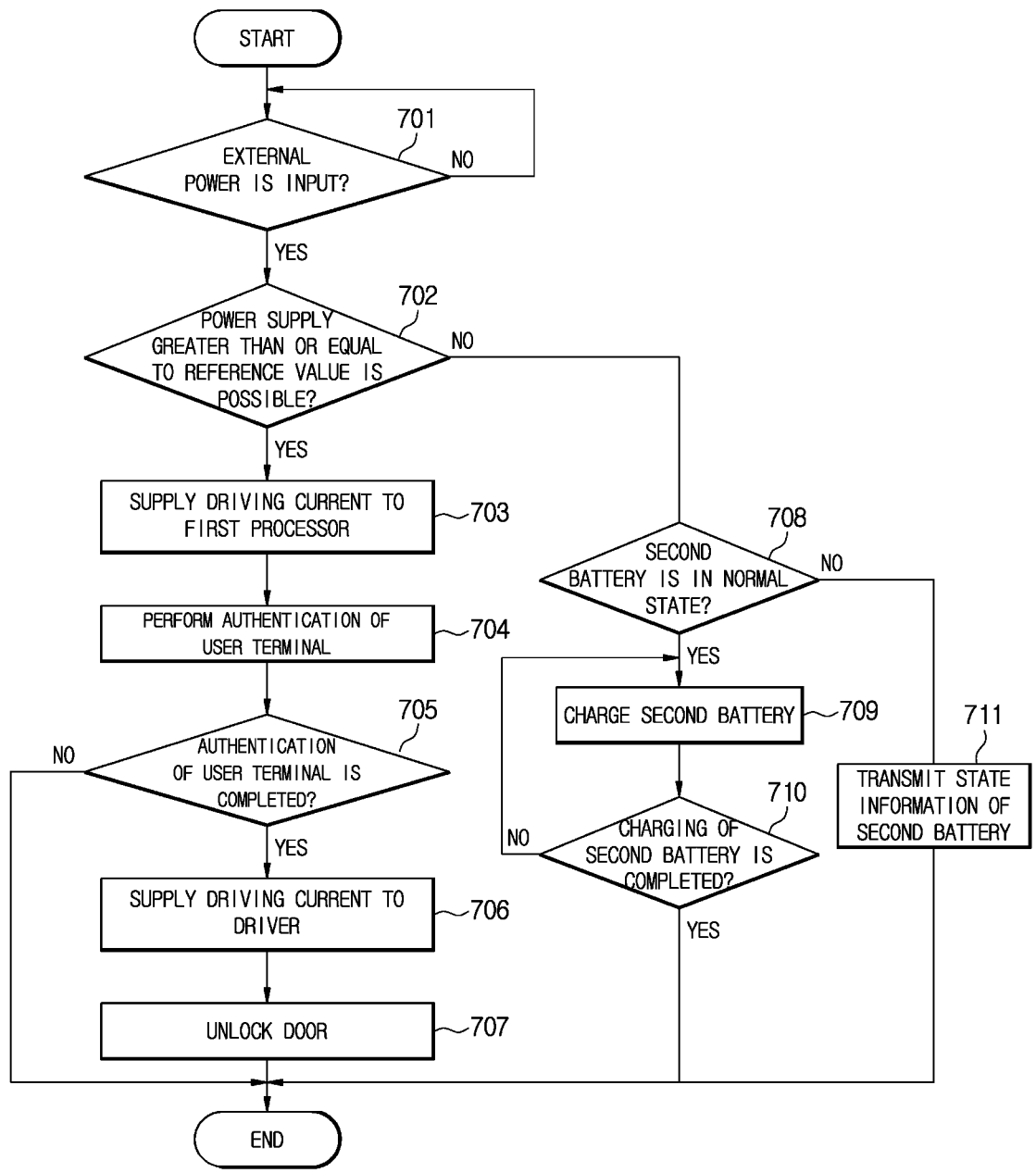
FIG. 7 is a flowchart of a control method of a vehicle according to another embodiment of the disclosure.

FIG. 7 is a flowchart of a control method of a vehicle according to another embodiment of the disclosure.

Referring to FIG. 7, the second processor 122 of the vehicle 100 according to an embodiment may confirm whether external power is input (701).

When external power is input through the external power input 160 (YES in 701), the second processor 122 may confirm whether or not power supply greater than or equal to a reference value is possible by external power (702).

Specifically, the second processor 122 may confirm whether the external power may supply a predetermined reference power or higher based on the state of the external power.

When it is possible to supply power more than or equal to a reference value (YES in 702), the second processor 122 may control external power to supply a driving current to the first processor 121 (703). In an embodiment, the reference value means a power value required to unlock the door 15L.

By driving current supplied from external power, the first processor 121 may perform authentication of the user terminal (704).

When authentication of the user terminal is completed (YES in 705), the second processor 122 may supply a driving current of the external power to the driver 130 (706), and the driver 130 may unlock the door 15L (707).

As another example, when it is impossible to supply power higher than or equal to the reference value by external power (NO in 702), the second processor 122 may confirm whether the second battery 142 is in a normal state (708).

When the second battery 142 is in a normal state (YES in 708), the second processor 122 may charge the second battery 142 by driving current from external power (709). The second processor 122 may confirm whether charging of the second battery 142 is completed (710), and may charge the second battery 142 until charging of the second battery 142 is completed.

When the second battery 142 is not in a normal state (NO in 708), the second processor 122 may confirm that the second battery 142 is defective. In this case, the second processor 122 may transmit state information of the second battery 142 to an external device (711), and the state information of the second battery 142 may include whether the second battery 142 has failed. The external device may include at least one of a user terminal 200, a surrounding vehicle, an infrastructure device, or a server.

Through this, even when both the first battery 141 and the second battery 142 are discharged, the door 15L may be unlocked through external power, so that the vehicle 100 may be accessed even in an emergency. Therefore, user convenience may be increased.

According to the vehicle and the control method thereof according to an embodiment, since the discharge risk of the battery provided in the vehicle can be provided step by step, it is possible to prevent an emergency situation due to battery discharge.

On the other hand, the disclosed embodiments may be implemented in the form of a recording medium for storing instructions executable by a computer. Instructions may be stored in the form of program code and, when executed by a processor, may generate a program module to perform the operations of the disclosed embodiments. The recording medium may be implemented as a computer-readable recording medium.

The computer-readable recording medium includes all kinds of recording media in which instructions can be decoded by a computer. For example, there may be read only memory (ROM), random access memory (RAM), a magnetic tape, a magnetic disk, a flash memory, an optical data storage device, and the like.

As described above, the disclosed embodiments have been described with reference to the accompanying drawings. Although example embodiments of the disclosure have been shown and described, it would be appreciated by those skilled in the art that changes may be made to these embodiments without departing from the principles and spirit of the disclosure, the scope of which is defined in the claims and their equivalents.

What is claimed is:

1. A vehicle comprising:
    an actuator configured to lock or unlock a door;
    a switch configured to receive an emergency operation command from a user;
    a transceiver configured to communicate with a user terminal;
    a power supply device including a first battery configured to supply a driving current to at least one electronic device and a second battery; and
    a controller configured to generate a state information based on whether the first battery or the second battery is at risk of discharge determined based on a state of charge of the power supply device and to control the transceiver to transmit the generated state information to the user terminal, wherein the state information includes at least one of a charge amount of a battery, a waiting time expected to be discharged, whether to discharge, whether to fail, or user guide information and wherein the controller comprises:
    a first processor configured to authenticate a user based on a signal received from the user terminal and, when user authentication is complete, to control the second battery to supply the driving current to the actuator to unlock the door; and
    a second processor configured to control the second battery to supply the driving current to the transceiver when the emergency operation command is received and to control the second battery to supply a driving current to the first processor when the first battery is discharged, the second processor being different than the first processor.

2. The vehicle according to claim 1, wherein the controller is configured to determine that there is a risk of discharge of the first battery when a charge amount of the first battery is equal to or less than a predetermined first reference value and to generate the state information to further include at least one of a discharge risk warning or a remote start information for the first battery.

3. The vehicle according to claim 1, wherein the controller is configured to determine that the first battery is discharged when a charge amount of the first battery is equal to or less than a predetermined second reference value and to generate the state information to further include at least one of a discharge warning for the first battery, charging information or emergency operation information of the second battery.

4. The vehicle according to claim 3, wherein the controller is configured to control the second battery to supply a driving current to the transceiver when the first battery is discharged.

5. The vehicle according to claim 1, wherein the first processor is configured to control the second battery to supply the driving current to the actuator to unlock the door in response to authentication of the user being completed.

6. The vehicle according to claim 1, wherein the controller is configured to determine that there is a risk of discharge of the second battery when a charge amount of the second battery is less than or equal to a predetermined third reference value and to generate the state information to further include at least one of a discharge risk warning for the second battery, charging information for the second battery, or external power information.

7. The vehicle according to claim 1, wherein the controller is configured to control the transceiver to transmit the generated state information to a surrounding vehicle or infrastructure device within a predetermined range.

8. A vehicle comprising:
an actuator configured to lock or unlock a door;
a switch configured to receive an emergency operation command from a user;
a transceiver configured to communicate with a user terminal;
a power supply device including a first battery configured to supply a driving current to at least one electronic device and a second battery;
an external power input configured to be connected to external power and receive a driving current from the external power; and
a controller configured to generate a state information based on whether the first battery or the second battery is at risk of discharge determined based on a state of charge of the power supply device and to control the transceiver to transmit the generated state information to the user terminal, wherein the state information includes at least one of a charge amount of a battery, a waiting time expected to be discharged, whether to discharge, whether to fail, or user guide information and wherein the controller comprises:
a first processor configured to authenticate a user based on a signal received from the user terminal and, in response to the user authentication being complete, to control the second battery to supply the driving current to the actuator to unlock the door; and
a second processor configured to control the second battery to supply the driving current to the transceiver when the emergency operation command is received and to control the second battery to supply a driving current to the first processor when the first battery is discharged, the second processor being different than the first processor.

9. The vehicle according to claim 8, wherein the controller is configured to charge the second battery by the external power when the external power is detected through the external power input.

10. The vehicle according to claim 8,
wherein the second processor is configured to transmit the driving current of the external power to at least one of the actuator, the transceiver, or the first processor when the first battery and the second battery are discharged and the external power is connected to the external power input.

11. A control method of a vehicle comprising a transceiver for communicating with a user terminal and a power supply device including a first battery for supplying a driving current to at least one electronic device and a second battery, the control method comprising:

generating a state information based on whether the first battery and the second battery are at risk of discharge determined based on a state of charge of the power supply device; and
transmitting the generated state information to the user terminal, wherein the state information includes at least one of a charge amount of a battery, a waiting time expected to be discharged, whether to discharge, whether to fail, or user guide information,
receiving an emergency operation command from a user:
supplying power from the second battery to the transceiver and a first processor to perform user authentication in response to receipt of the emergency operation command;
authenticating the user based on a signal received from the user terminal:
supplying power from the second battery to an actuator and the first processor in response to the authentication is complete;
unlocking a door of the vehicle in response to an operation of the actuator and
supplying a driving current of the second battery to the transceiver when the first battery is discharged.

12. The control method according to claim 11, wherein generating the state information comprises determining that there is a risk of discharge of the first battery when a charge amount of the first battery is equal to or less than a predetermined first reference value, the state information further including at least one of a discharge risk warning or remote start information for the first battery.

13. The control method according to claim 11, wherein generating the state information comprises determining that the first battery is discharged when a charge amount of the first battery is equal to or less than a predetermined second reference value, the state information further including at least one of a discharge warning for the first battery, charging information or emergency operation information of the second battery.

14. The control method according to claim 11, wherein supplying power from the second battery comprises supplying power from the second battery to the actuator and the first processor in response to the authentication being complete.

15. The control method according to claim 11, wherein generating the state information comprises determining that there is a risk of discharge of the second battery when a charge amount of the second battery is less than or equal to a predetermined third reference value, the state information further including at least one of a discharge risk warning for the second battery, charging information for the second battery, or external power information.

16. The control method according to claim 11, further comprising charging the second battery by external power when the external power is detected.

17. The control method according to claim 11, further comprising transmitting the generated state information to a surrounding vehicle or infrastructure device within a predetermined range.

\* \* \* \* \*